(12) United States Patent
Murasugi

(10) Patent No.: US 6,887,183 B2
(45) Date of Patent: May 3, 2005

(54) SYSTEM AND METHOD OF CONTROLLING AUTOMATIC TRANSMISSION

(75) Inventor: Takashi Murasugi, Shizuoka (JP)

(73) Assignee: JATCO Ltd, Fuji (JP)

(*) Notice: Subject to any disclaimer, the term of this patent is extended or adjusted under 35 U.S.C. 154(b) by 0 days.

(21) Appl. No.: 10/254,875

(22) Filed: Sep. 26, 2002

(65) Prior Publication Data

US 2003/0064857 A1 Apr. 3, 2003

(30) Foreign Application Priority Data

Sep. 28, 2001 (JP) ........................... 2001-302950

(51) Int. Cl.$^7$ ............................................. F16H 61/04
(52) U.S. Cl. ..................................................... 477/143
(58) Field of Search .............................. 477/143, 148, 477/154, 155

(56) References Cited

U.S. PATENT DOCUMENTS 5,810,692 A * 9/1998 Takiguchi et al. .......... 477/144
6,073,071 A * 6/2000 Yasue et al. ................ 477/143
6,319,172 B1 * 11/2001 Steinmetz et al. .......... 477/143
6,334,833 B1 * 1/2002 Ochi et al. .................. 477/143
6,346,063 B1 * 2/2002 Kondo et al. ............... 477/148
6,503,165 B1 * 1/2003 Kubo et al. ................. 477/155

FOREIGN PATENT DOCUMENTS

EP     758061 A1    2/1997
JP     9-49566 A    2/1997

* cited by examiner

Primary Examiner—Dirk Wright
(74) Attorney, Agent, or Firm—Foley & Lardner LLP

(57) ABSTRACT

In a system for controlling an automatic transmission, an ECU is constructed to carry out changeover control in accordance with shift determination from second speed to first speed to achieve release of a second engaging element and engagement of a first engaging element, detect a magnitude of a torque signal before a predetermined time of shift determination when the changeover control is carried out, and control release of the second engaging element in accordance with the magnitude of the torque signal.

15 Claims, 6 Drawing Sheets

|  | LOW/C | 3-5R/C | H/C | L&R/B | 2-6/B | LOW/OWC |
|---|---|---|---|---|---|---|
| 1ST | ○ | | | ⊗ | | ▨ |
| 2ND | ○ | | | | ○ | |
| 3RD | ○ | ○ | | | | |
| 4TH | ○ | | ○ | | | |
| 5TH | | ○ | ○ | | | |
| 6TH | | | ○ | | ○ | |
| REV | | ○ | | ○ | | |

⊗ : ENGINE BRAKE

SYSTEM AND METHOD OF CONTROLLING AUTOMATIC TRANSMISSION

BACKGROUND OF THE INVENTION

The present invention relates to a system and method of controlling an automatic transmission for a vehicle, and more particularly, to changeover control for releasing engaging means in the engaged state and engaging another engaging means in the released state at shift operation.

Typically, the automatic transmission achieves multiple speeds by changing the power transfer path of a gear train through engagement and release of frictional engaging means in such a manner as to mutually engage speed-change elements with a planetary gear by a clutch or fixing them to a transmission casing by a brake. In the automatic transmission, at downshift between two adjacent speeds, for example, from third speed to second speed, changeover is carried out by releasing the first engaging means to be engaged for achieving third speed while engaging the second engaging means to be engaged for achieving second speed.

In such shift operation, the releasing and engaging timing of the engaging means is of importance. If engagement lags behind release, engine idle revving occurs, whereas if engagement fairly leads release, tie-up between the two engaging means occurs, leading to a greater shift shock.

JP-A 9-49566 describes a technique for properly achieving the changeover timing of the two engaging means. In this reference, an accumulator back-pressure map is set to correspond to the vehicle speed and the throttle acceleration. The releasing pressure and the engaging pressure of the two engaging means are adjusted by using the vehicle speed, the throttle acceleration, and preprogrammed values, thus achieving optimized changeover timing.

With the above technique, however, changeover control is carried out in accordance with the throttle acceleration, having the following problem to be solved.

FIG. 5 shows a shift line 3-2 for second speed and third speed. When a throttle opening TH crosses the shift line 3-2 from bottom to top, downshift is made from third speed to second speed. FIG. 5 shows two examples for a change in throttle opening, which cross the shift line 3-2, one being a case of changing the throttle opening TH from Ab to Aa and another being a case changing the throttle opening TH from Bb to Ba. Assuming that the two examples are of the same variation TH of the throttle opening TH.

When changing the throttle opening TH at the same speed, control is carried out, in either case, to decrease the release-side accumulator back pressure in a short time due to the same throttle acceleration.

When the throttle opening TH is immediately before crossing the shift line 3-2, and thus has a small value, the changeover timing can be optimized. However, when the throttle opening TH has a large value, i.e. when the throttle opening TH varies from Bb to Ba, input torque from the engine to the automatic transmission is increased in advance. In this state, if the release-side accumulator back pressure or releasing pressure is reduced in a short time, the first engaging means engaged before engagement of the second engaging means to be engaged is changed to the torque non-transfer state in a short time, leading to not only occurrence of drawing that the vehicle acceleration lowers once to a value close to zero G as illustrated in FIG. 5, but also occurrence of engine idle revving.

SUMMARY OF THE INVENTION

It is, therefore, an object of the present invention to provide a system and method of controlling an automatic transmission which allows achievement of smooth shift without engine idle revving nor drawing of the vehicle acceleration.

The present invention provides generally a system which comprises: an automatic transmission which achieves a first speed by engagement of a first engaging element and a second speed by engagement of a second engaging element; a device which generates a torque signal corresponding to input torque to the automatic transmission; and an electronic control unit (ECU) which controls the automatic transmission, the ECU being constructed to: determine shift from the second speed to the first speed; carry out changeover control in accordance with the determined shift to achieve release of the second engaging element and engagement of the first engaging element; detect a magnitude of the torque signal before a predetermined time of the determined shift when the changeover control is carried out; and control the release of the second engaging element in accordance with the magnitude of the torque signal.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figures 1, 2:
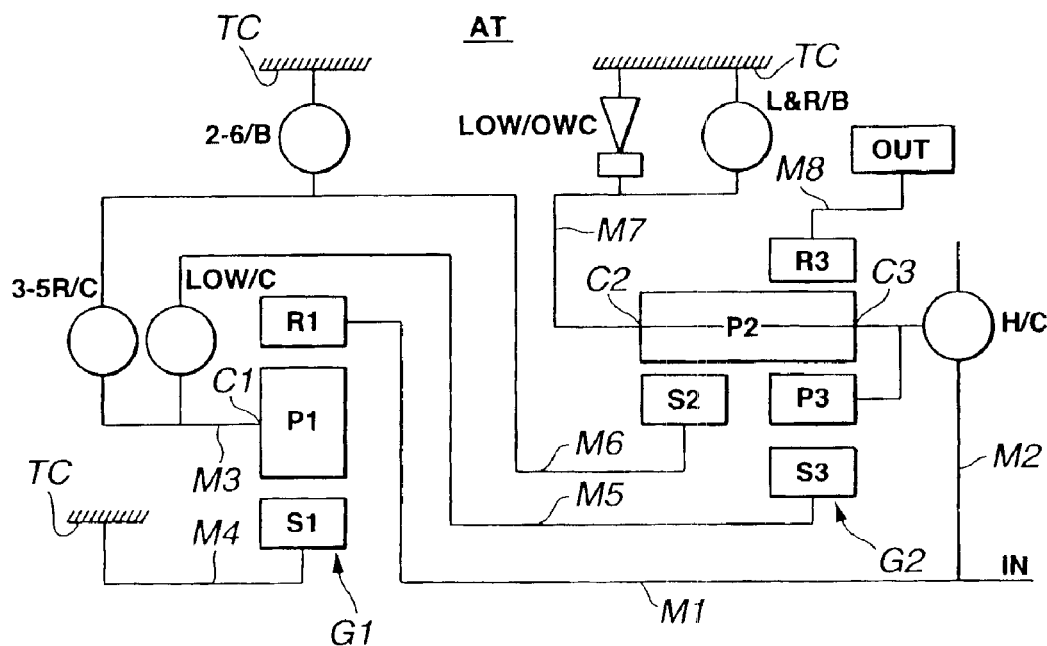
FIG. 1 is a block diagram showing an automatic transmission to which a system embodying the present invention is applied.
FIG. 2 is a diagram showing an engagement logic in the embodiment.

Referring to the drawings, a system for controlling an automatic transmission embodying the present invention is described.

Referring to FIG. 1, the constitution of the system is described. FIG. 1 shows a gear train of an automatic transmission AT with six forward speeds 1ST–6TH and one reverse REV, to which the present invention is applied. The gear train of this automatic transmission includes a combination of a simple planetary-gear set G1 and a Ravigneoux-type composite planetary-gear set G2. The simple planetary-gear set G1 includes a first sun gear S1, a first pinion P1 meshed with the first sun gear S1, a first carrier C1 for supporting the first pinion P1, and a first ring gear R1 meshed with the first pinion P1. The Ravigneoux-type composite planetary-gear set G2 includes a second sun gear S2, a second pinion P2 meshed with the second sun gear S2, a second carrier C2 for supporting the second pinion P2, a third sun gear S3, a third pinion P3 meshed with the second pinion P2 and the third sun gear S3, a third carrier C3 for supporting the second pinion P2, and a third ring gear R3 meshed with the second pinion P2.

An input shaft IN to which engine torque is input via an engine and torque converter, not shown, is coupled to the first ring gear R1 directly through a first member M1, and also to the third carrier C3 through a second member M2 and a high clutch H/C.

The first carrier C1 is coupled to the third sun gear S3 through a third member M3, a low clutch LOW/C, and a fifth member MS, and also to the second sun gear S2 through the third member M3, a 3-5 reverse clutch 3-5R/C, and a sixth member M6. The sixth member M6 is arranged fixable and releasable with respect to a transmission casing TC through a 2-6 brake 2-6/B.

The first sun gear S1 is fixed to the transmission casing TC through the fourth member M4. The second carrier C2 is supported to the transmission casing TC to be rotatable in one direction through a seventh member M7 and a low & reverse brake L&R/B and low one-way clutch LOW/OWC disposed parallel. A restraint and a restraint cancellation of that rotation are possible. The third ring gear R3 is coupled to an output gear OUT through an eighth member M8.

The automatic transmission AT performs automatic shift control of six forward speeds 1ST–6TH in the D-range position in accordance with an operation point determined by the vehicle speed and the throttle opening and a shift schedule, and shift control of one reverse REV through select operation from the D-range position to the R-range position. FIG. 2 shows operation of frictional elements in this shift control. Referring to FIG. 2, a cell with circle denotes engagement, a cell with no sign denotes release, a cell with cross in circle denote engagement carried out during engine braking, and a hatched cell denotes mechanical engagement or restrained rotation during engine driving.

First speed 1ST is achieved through engagement of the low clutch LOW/C and the low & reverse brake L&R/B. At first speed 1ST, rotation of the input shaft IN reduced through the first member M1 and the simple planetary-gear set G1 is input to the third sun gear S3 through the third member M3, the low clutch LOW/C, and the fifth member M5. Through engagement of the low one-way clutch LOW/OWC, the third ring gear R3 is reduced in rotation while receiving a reaction from the second carrier C2 fixed to the transmission casing TC, so that reduced rotation at the maximum reduction ratio is output from the output gear OUT through the eighth member M8. During engine braking, the low & reverse brake L&R/B receives a reaction in place of the low one-way clutch LOW/OWC which is being idling.

Second speed 2ND is achieved through engagement of the low clutch LOW/C and the 2-6 brake 2-6/B. At second speed 2ND, rotation of the input shaft IN reduced through the first member M1 and the simple planetary-gear set G1 is input to the third sun gear S3 through the third member M3, the low clutch LOW/C and the fifth member M5. Through engagement of the 2-6 brake 2-6/B, the third ring gear R3 is reduced in rotation while receiving a reaction from the second sun gear S2 fixed to the transmission casing TC, so that reduced rotation at a reduction ratio smaller than that of first speed 1ST is output from the output gear OUT through the eighth member M8.

Third speed 3RD is achieved through engagement of the low clutch LOW/C and the 3-5 reverse clutch 3-5R/C. At third speed 3RD, rotation of the input shaft IN reduced through the first member M1 and the simple planetary-gear set G1 is input to the third sun gear S3 through the third member M3, the low clutch LOW/C, and the fifth member M5, and also to the second sun gear S2 through the third member M3, the 3-5 reverse clutch 3-5R/C, and the sixth member M6, achieving direct coupling of the Ravigneoux-type composite planetary-gear set G2. Thus, the third ring gear R3 is rotated in the same direction as that of the sun gears S2, S3, so that reduced rotation at a reduction ratio smaller than that of second speed 2ND is output from the output gear OUT through the eighth member M8.

Fourth speed 4TH is achieved through engagement of the low clutch LOW/C and the high clutch H/C. At fourth speed 4TH, on the one hand, rotation of the input shaft IN reduced through the first member M1 and the simple planetary-gear set G1 is input to the third sun gear S3 through the third member M3, the low clutch LOW/C, and the fifth member M5. On the other hand, rotation of the input shaft IN without being reduced is input to the third carrier C3 through the second member M2 and the high clutch H/C. The third ring gear R3 is rotated at the middle rotation rate between the two input-rotation rates, so that rotation slightly reduced with respect to input rotations is output from the output gear OUT through the eighth member M8.

Fifth speed 5TH is achieved through engagement of the 3-5 reverse clutch 3-5R/C and the high clutch H/C. At fifth speed 5TH, on the one hand, rotation of the input shaft IN reduced through the first member M1 and the simple planetary-gear set G1 is input to the second sun gear S2 through the third member M3, the 3-5 reverse clutch 3-5R/C, and the sixth member M6. On the other hand, rotation of the input shaft IN without being reduced is input to the third carrier C3 through the second member M2 and the high clutch H/C. The third ring gear R3 is rotated with being restricted by the two rotations, so that rotation slightly increased with respect to input rotations is output from the output gear OUT through the eighth member M8.

Sixth speed 6TH is achieved through engagement of the high clutch H/C and the 2-6 brake 2-6/B. At sixth speed 6TH, rotation of the input shaft IN without being reduced is input to only the third carrier C3 through the second member M2 and the high clutch H/C. The third ring gear R3 is increased in rotation while receiving a reaction from the second sun gear S2 fixed to the transmission casing TC through engagement of the 2-6 brake 2-6/B, so that rotation further increased with respect to fifth speed 5TH is output from the output gear OUT through the eighth member M8.

Reverse REV is achieved through engagement of the 3-5 reverse clutch 3-5R/C and the low & reverse brake L&R/B. At reverse REV, rotation of the input shaft IN reduced through the first member M1, the simple planetary-gear set G1 is input to the second sun gear S2 through the third member M3, the 3-5 reverse clutch 3-5R/C, and the sixth member M6. The third ring gear R3 is rotated in the reverse direction while receiving a reaction from the second carrier C2 fixed to the transmission casing TC through engagement of the low & reverse brake L&R/B, so that reduced reverse rotation is output from the output gear OUT through the eighth member M8.

Figure 3:
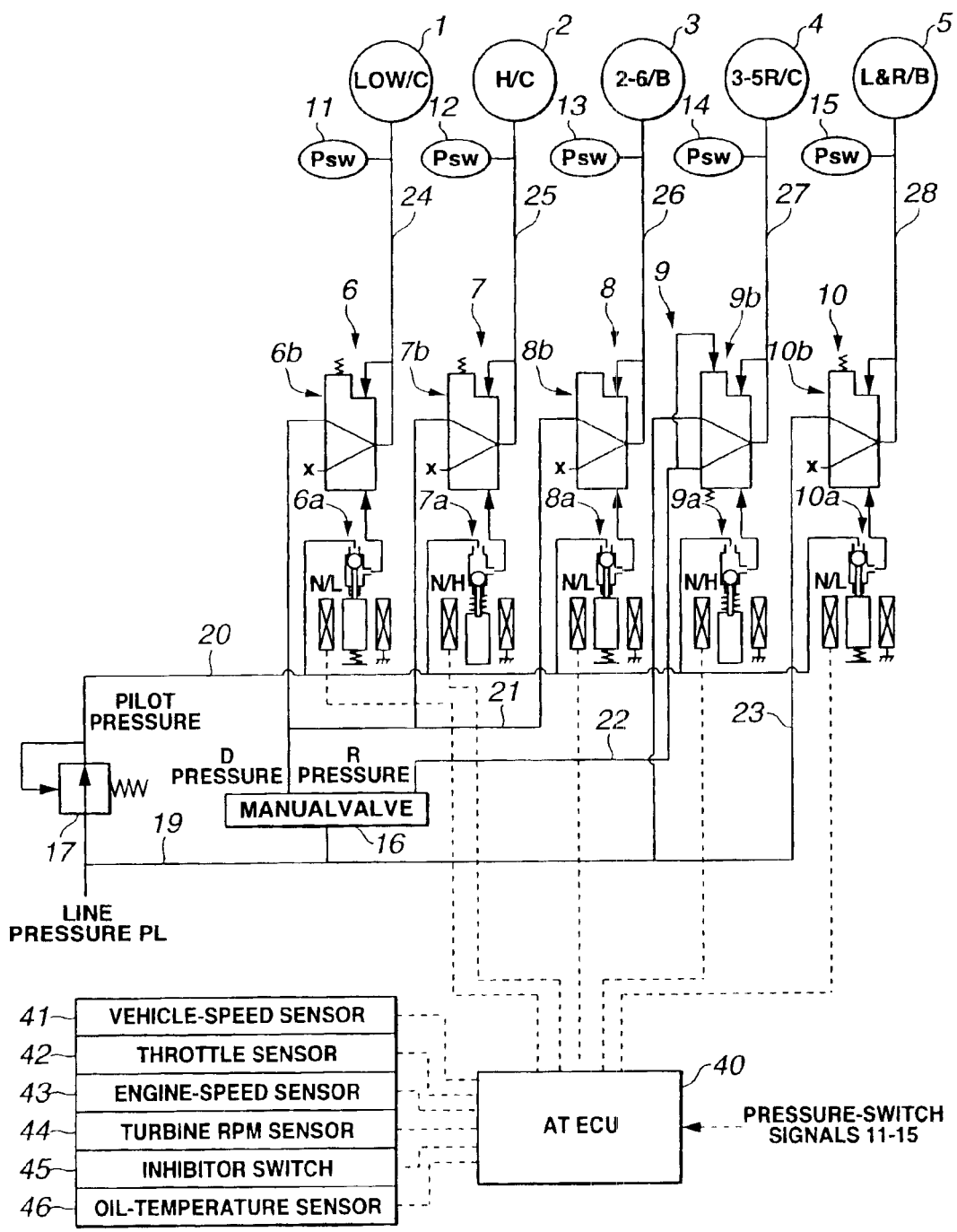
FIG. 3 is a diagram similar to FIG. 1, showing a hydraulic circuit and an electronic shift-control system in the embodiment.

Referring to FIG. 3, a hydraulic circuit and an electronic shift-control system for achieving shift control are described. Referring to FIG. 3, reference numeral 1 designates an engaging piston chamber of the low clutch LOW/C, 2 designates an engaging piston chamber of the high clutch H/C, 3 designates an engaging piston chamber of the 2-6 brake 2-6/B, 4 designates an engaging piston chamber of the 3-5 reverse clutch 3-5R/C, and 5 designates an engaging piston chamber of the low & reverse brake L&R/B. The low clutch LOW/C, the high clutch H/C, the 2-6 brake 2-6/B, the 3-5 reverse clutch 3-5R/C, and the low & reverse brake L&R/B are engaged by receiving the engaging pressure, i.e. D-range pressure or R-range pressure, to the engaging piston chambers 1–5, and they are released by removing the engaging pressure therefrom. The D-range pressure is a line pressure obtained through a manual valve, and is produced only when selecting the D range. The R-range pressure is a line pressure obtained through a manual valve, and is produced only when selecting the R range. At the other ranges than the R range, the R-range pressure communicates with a drain port, producing no pressure reduction.

Referring to FIG. 3, reference numeral 6 designates a first hydraulic control valve for controlling the engaging pressure to the low clutch LOW/C, 7 designates a second hydraulic control valve for controlling the engaging pressure to the high clutch H/C, 8 designates a third hydraulic control valve for controlling the engaging pressure to the 2-6 brake 2-6/B, 9 designates a fourth hydraulic control valve for controlling the engaging pressure to the 3-5 reverse clutch 3-5R/C, and 10 designates a fifth hydraulic control valve for controlling the engaging pressure to the low & reverse brake L&R/B.

The first hydraulic control valve 6 comprises a first duty solenoid 6a for producing the shift-control pressure by a solenoid force using the pilot pressure as source pressure, and a first pressure regulating valve 6b for regulating the low-clutch pressure using the D-range pressure as source pressure and the shift-control pressure and feedback pressure as operating signal pressure. The first duty solenoid 6a is controlled in accordance with the duty ratio in such a manner as to bring the low-clutch pressure to zero when the solenoid is turned off, and increase it with an increase in the ON duty ratio when the solenoid is turned on.

The second hydraulic control valve 7 comprises a second duty solenoid 7a for producing the shift-control pressure by a solenoid force using the pilot pressure as source pressure, and a second pressure regulating valve 7b for regulating the high-clutch pressure using the D-range pressure as source pressure and the shift-control pressure and feedback pressure as operating signal pressure. The second duty solenoid 7a is controlled in such a manner as to bring the high-clutch pressure to zero when the solenoid is turned on (100% ON duty ratio), increase it with a decrease in the ON duty ratio, and bring it to the maximum pressure when the solenoid is turned off.

The third hydraulic control valve 8 comprises a third duty solenoid 8a for producing the shift-control pressure by a solenoid force using the pilot pressure as source pressure, and a third pressure regulating valve 8b for regulating the 2-6 brake pressure using the D-range pressure as source pressure and the shift-control pressure and feedback pressure as operating signal pressure. The third duty solenoid 8a is controlled in such a manner as to bring the 2-6 brake pressure to zero when the solenoid is turned off, and increase it with an increase in the ON duty ratio when the solenoid is turned on.

The fourth hydraulic control valve 9 comprises a fourth duty solenoid 9a for producing the shift-control pressure by a solenoid force using the pilot pressure as source pressure, and a fourth pressure regulating valve 9b for regulating the 3-5 reverse-clutch pressure using the line pressure as source pressure and the shift-control pressure and feedback pressure as operating signal pressure when selecting the D range and for directly supplying the line pressure or R-range pressure as 3-5 reverse-clutch pressure using the R-range pressure as operating signal pressure when selecting the R-range pressure. The fourth duty solenoid 9a is controlled in such a manner as to bring the 3-5 reverse-clutch pressure to zero when the solenoid is turned on (100% ON duty ratio), increase it with a decrease in the ON duty ratio, and bring it to the maximum pressure when the solenoid is turned off.

The fifth hydraulic control valve 10 comprises a fifth duty solenoid 10a for producing the shift-control pressure by a solenoid force using the pilot pressure as source pressure, and a fifth pressure regulating valve 10b for regulating the low & reverse brake pressure using the line pressure as source pressure and the shift-control pressure and feedback pressure as operating signal pressure. The fifth duty solenoid 10a is controlled in such a manner as to bring the low & reverse brake pressure to zero when the solenoid is turned off, and increase it with an increase in the ON duty ratio when the solenoid is turned on.

Referring to FIG. 3, reference numeral 11 designates a first pressure switch or hydraulic-pressure detecting means, 12 designates a second pressure switch or hydraulic-pressure detecting means, 13 designates a third pressure switch or hydraulic-pressure detecting means, 14 designates a fourth pressure switch or hydraulic-pressure detecting means, 15 designates a fifth pressure switch or hydraulic-pressure detecting means, 16 designates a manual valve, 17 designates a pilot valve, 18 designates a shuttle ball valve, 19 designates a line pressure passage, 20 designates a pilot pressure passage, 21 designates a D-range pressure passage, 22 designates an R-range pressure passage, 24 designates a low-clutch pressure passage, 25 designates a high-clutch pressure passage, 26 designates a 2-6 brake pressure passage, 27 designates a 3-5 reverse-clutch pressure passage, and 28 designates a low & reverse brake pressure passage. Specifically, the first to fifth pressure switches 11-15 are arranged in the low-clutch pressure passage 24, the high-clutch pressure passage 25, the 2-6 brake pressure passage 26, the 3-5 reverse-clutch pressure passage 27, and the low & reverse brake pressure passage 28, respectively, to detect the presence of the engaging pressure in accordance with switch signals which are turned on when the engaging pressure is present, and turned off when it is not present.

Referring to FIG. 3, reference numeral 40 designates an automatic transmission (AT) electronic control unit (ECU) or control means, 41 designates a vehicle-speed sensor, 42 designates a throttle sensor or torque-signal generating means, 43 designates an engine-speed sensor, 44 designates a turbine rpm sensor, 45 designates an inhibitor switch, and 46 designates an oil-temperature sensor, which constitute the electronic shift-control system. The AT ECU 40 inputs switch signals out of the pressure switches 11-15 and signals out of the sensors and switch 41–45 to carry out computing in accordance with the above input information and a preprogrammed shift-control regulation and fail-safe control regulation. In accordance with the results of computing, the AT ECU 40 outputs solenoid drive signals to the first to fifth duty solenoids 6a–10a.

Figure 4:
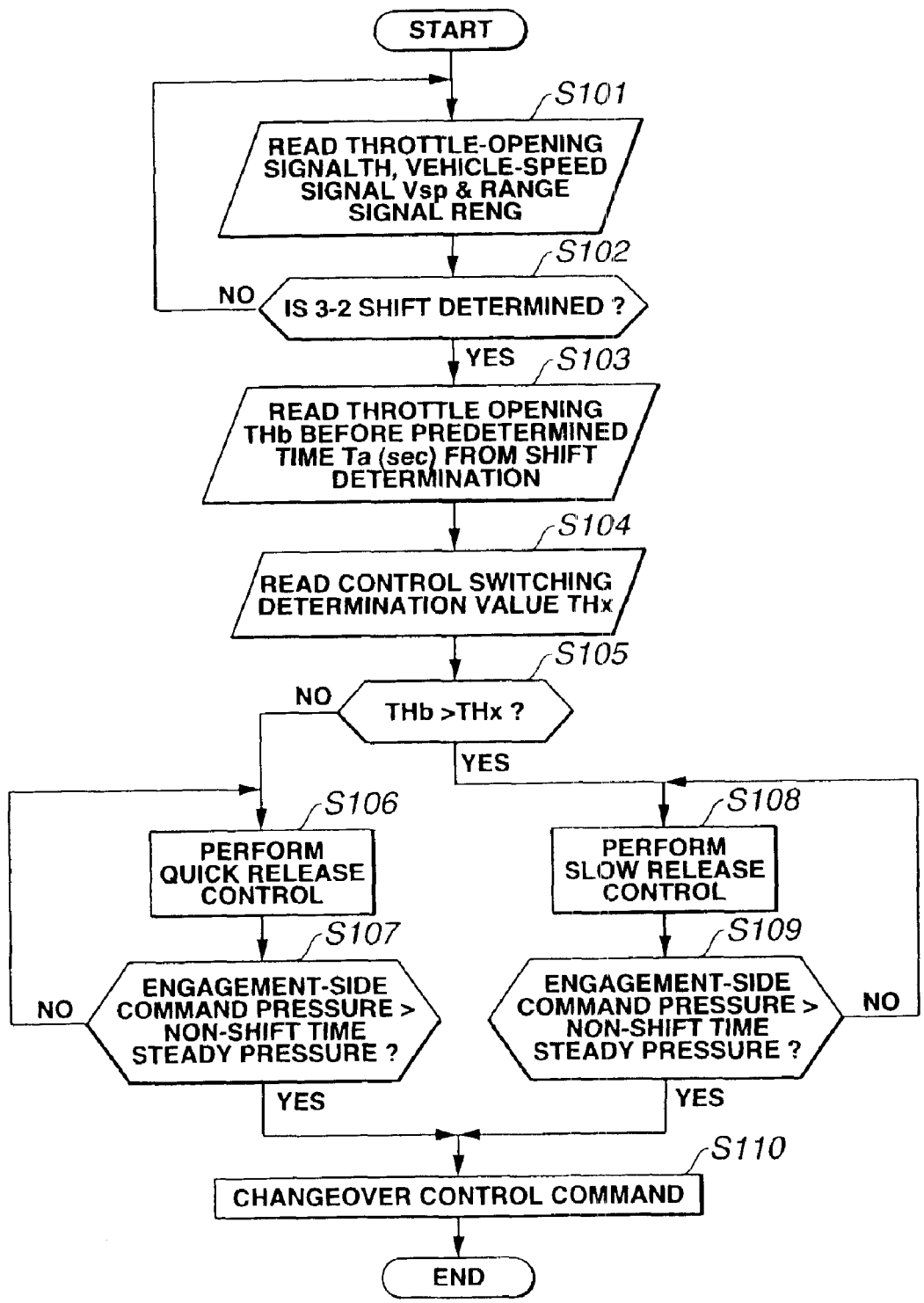
FIG. 4 is a flowchart showing operation of the embodiment.
Figure 5:
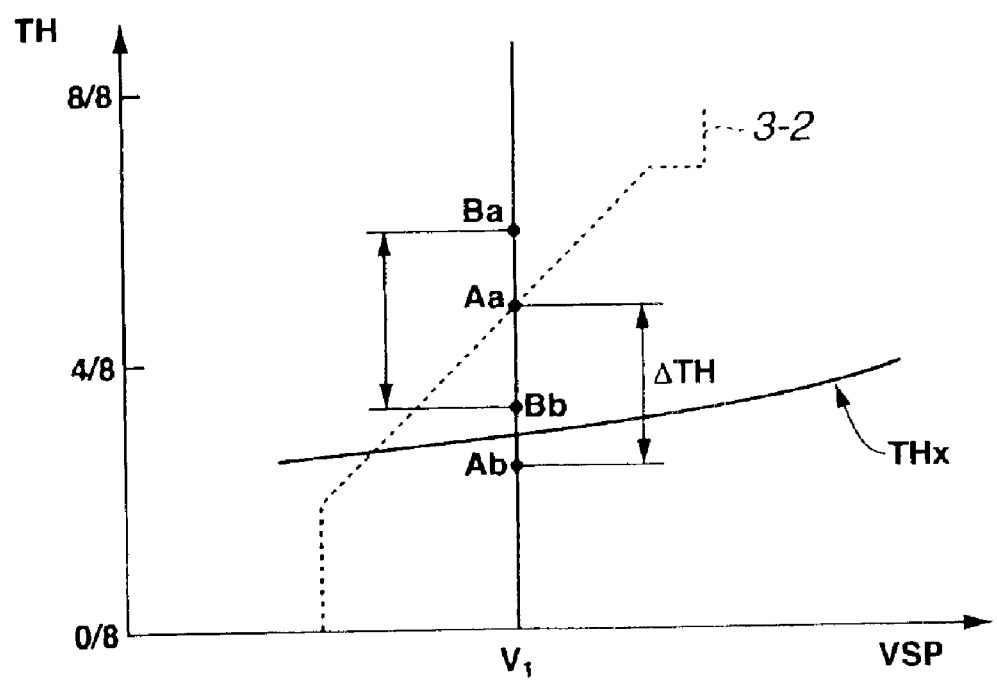
FIG. 5 is a graph illustrating the shift determination characteristic and the switching determination-value characteristic.

Referring to FIG. 4, changeover control carried out in the AT ECU 40 at downshift from third speed 3RD to second speed 2ND is described. At a step S101, the throttle opening TH, the vehicle speed Vsp, and the range position RENG are read from the throttle sensor 42, the vehicle-speed sensor 41, and inhibitor switch 45, respectively. At a step S102, it is determined whether or not 3-2 downshift determination is made. If the answer is YES, flow proceeds to a step S103, whereas if the answer is NO, flow returns to the step S101. Shift determination is made in accordance with the shift line 3-2 of the throttle opening TH vs. the vehicle speed Vsp as shown in FIG. 5, wherein when the throttle opening TH crosses the shift line 3-2 from bottom to top, it is determined that downshift is made from third speed 3RD to second speed 2ND.

At a step S103, it is read a throttle opening THb before a predetermined time Ta (sec), e.g. about 0.1 or 0.2 (sec), from shift determination. At a step S104, a control switching determination value THx is determined in accordance with the map shown in FIG. 5 and corresponding to the vehicle speed Vsp. The control switching determination value THx is set, for example, at a value slightly larger than he throttle opening corresponding to a low road load. At a step S105, It is determined whether or not the throttle opening THb before predetermined time Ta (sec) is larger than the control switching determination value THx. If the answer is No, i.e. THb≦THx, flow proceeds to a step S106 for quick release control, whereas if the answer is YES, i.e. THb>THx, flow proceeds to a step S108 for slow release control.

Figure 6:
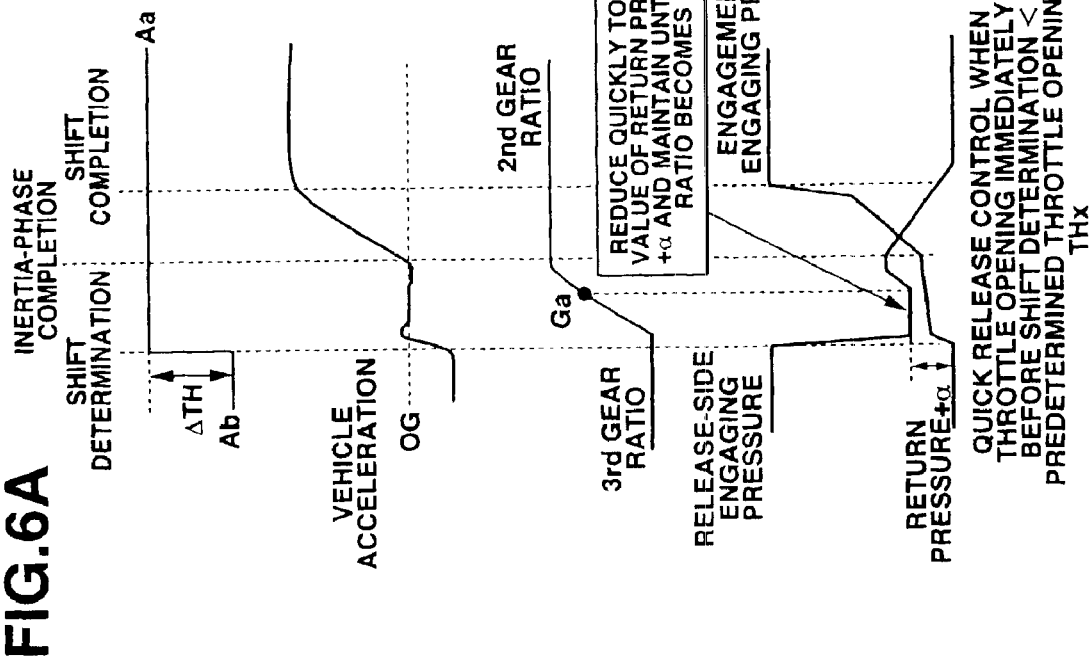
FIGS. 6A–6B are time charts showing changeover control in the embodiment.

Referring to FIG. 6A, in quick release control at the step S106, the release-side engaging pressure, i.e. engaging pressure of 3-5 reverse-clutch 3-5R/C, is quickly reduced from the maximum control pressure corresponding to the line pressure to a small pressure of the pressure corresponding to a load of a return spring of the 3-5 reverse-clutch 3-5R/C (refer hereinafter to as return pressure)+α, which is maintained until the gear ratio reaches a predetermined ratio Ga. In this embodiment, after the gear ratio reaches predetermined ratio Ga, control of slightly increasing the release-side engaging pressure (duty ratio) is carried out immediately before inertia-phase completion so as not to cause feel of drawing due to sudden change in the gear ratio to second speed 2ND. When it is determined at a step S107 that the engagement-side command pressure is greater than a non-shift time steady pressure, flow proceeds to a step S110 where quick release control at the step S106 is completed.

Referring to FIG. 6B, in slow release control at the step S108, the release-side engaging pressure is once reduced from the maximum control pressure corresponding to the line pressure to the minimum pressure which is, e.g. about 80% pressure at engagement (S>0.8) and allows transfer of input torque. Then, it is reduced at a predetermined gradient in accordance with input torque of the automatic transmission AT. This gradient can be constant, or determined, e.g. in accordance with the throttle acceleration or the like. When it is determined at a step S109 that the engagement-side command pressure is greater than non-shift time steady pressure, flow proceeds to the step S110 where slow release control at the step S108 is completed.

Next, operation of this embodiment is described. When the throttle opening TH crosses the shift line 3-2 as shown in FIG. 5 from bottom to top, the AT ECU 40 carries out control to downshift the automatic transmission AT from the third speed 3RD to second speed 2ND. Specifically, changeover control is carried out to change the state of the low clutch LOW/C and the 3-5 reverse clutch 3-5R/C both engaged to the state of the 3-5 reverse clutch 3-5R/C released and the 2-6 brake 2-6/B engaged.

In this embodiment, for execution of changeover control, when the throttle opening THb immediately before shift determination, which is lower than predetermined value THx, crosses the shift line 3-2, quick release control is carried out, whereas when the throttle opening THb which is higher tan predetermine value THx crosses the shift line 3-2, slow release control is carried out.

Specifically, referring to FIG. 5, when the throttle opening TH varies from Ab to Aa, input torque to the automatic transmission AT before shift is relatively small. Thus, quick release control is carried out to quickly reduce the pressure of the 3-5 reverse clutch 3-5R/C to a low pressure, i.e. return pressure+α, as shown in FIG. 6A. This allows achievement of smooth shift with short shift time and no drawing.

On the other hand, when the throttle opening TH varies from Bb to Ba, input torque to the automatic transmission AT before shift is relatively large. Thus, slow release control is carried out to reduce once the pressure of the 3-5 reverse clutch 3-5R/C to a pressure which produces no gear-ratio change (S=0.8 or more with respect to input torque at shift determination) as shown in FIG. 6B. Then, the pressure is reduced slowly from this high pressure at the gradient in accordance with input torque. Therefore, when input torque to the automatic transmission AT is greater, the release-side 3-5 reverse clutch 3-5R/C is released completely before the engagement-side 2-6 brake 2-6/B allows torque transfer, preventing occurrence of feel of drawing, engine idle revving, and a thrust shock due to engine idle revving, resulting in achievement of smooth shift.

As described above, according to the present invention, release of the second engaging means is controlled in accordance with a magnitude of input torque to the automatic transmission. This can prevent occurrence of engine idle revving due to relatively advanced engaging timing of the second engaging means than that of the first engaging means when input torque is larger, and occurrence of a shift shock due to relatively lagged engaging timing of the second engaging means than that of the first engaging means when input torque is smaller. Therefore, a system for controlling an automatic transmission can be obtained which allows achievement of smooth shift without engine idle revving nor drawing of the vehicle acceleration at changeover control.

Moreover, according to the present invention, determination of the magnitude of input torque at changeover control is carried out in accordance with the throttle opening used essentially for shift determination of the automatic transmission and a preprogrammed map, allowing low-cost device constitution without any sensor and simple and quick control with less control capacity. This leads to execution of accurate and low-cost changeover control with no control lag.

Having described the present invention in connection with the preferred embodiment, it is noted that the present invention is not limited thereto, and various changes and modifications can be made without departing from the scope of the present invention.

Figure 7:
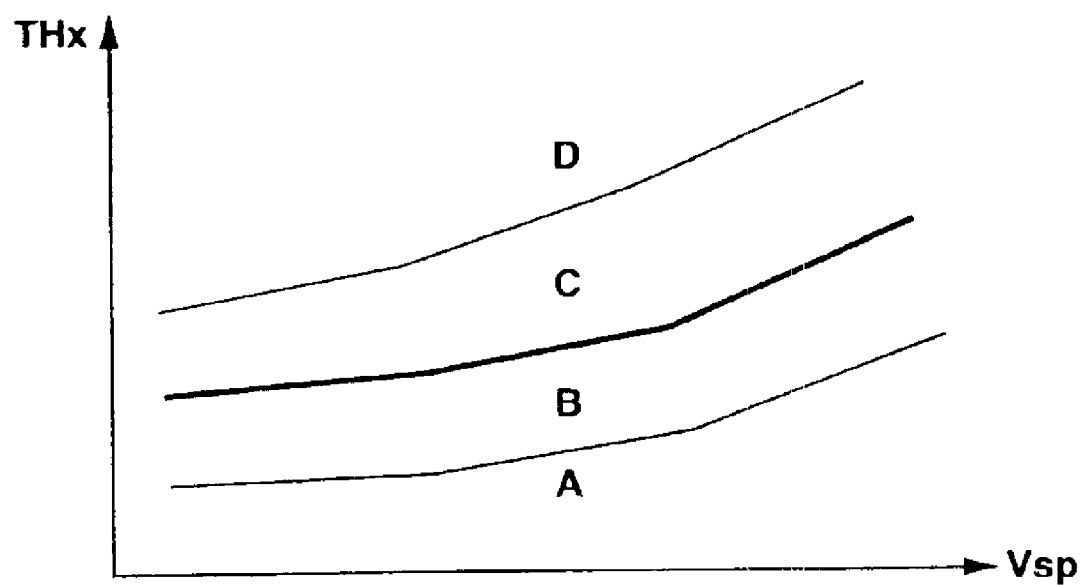
FIG. 7 is a graph similar to FIG. 5, illustrating another embodiment of the present invention.

By way of example, the constitution of the automatic transmission AT is not limited to that shown in the embodiment, and may be of three, four, five or seven speeds. Moreover, changeover control is applied to 3-2 downshift in the illustrative embodiment, but it may be applied to 6-5, 5-4, 4-3 or 2-1 downshift. Further, the engaging elements are engaged or released by supply and discharge of the hydraulic pressure in the illustrative embodiment, but they may directly be engaged or released by electromagnetic solenoids. In this variation, without reducing the release-side pressure, electric power supplied to the release side is reduced in the duty ratio, for example. Still further, the switch determination value THx is set in a single characteristic as shown in FIG. 5 in the illustrative embodiment. Alternatively, multiple switch determination characteristics A-D may be set as shown in FIG. 7 to change the reducing gradient of the release-side engaging pressure in accordance with to which characteristic A-D the throttle opening THb immediately before shift determination belongs.

Alternatively, the switch determination characteristic may be set in a stepless manner to determine the reducing gradient of the release-side engaging pressure in accordance with the throttle opening THb immediately before shift determination. Furthermore, the torque-signal generating means include throttle sensor 42 in the illustrative embodiment. Since the torque-signal generating means are used to detect input torque to the automatic transmission AT, they may be means for receiving a signal corresponding to output torque from an engine-drive control unit or means for obtaining input torque to the automatic transmission AT in accordance with a difference between the engine speed and the turbine rpm.

The entire teachings of Japanese Patent Application P2001-302950 filed Sep. 28, 2001 are incorporated hereby by reference.

What is claimed is:

1. A system, comprising:
    an automatic transmission which achieves a first speed by engagement of a first engaging element and a second speed by engagement of a second engaging element;
    a device which generates a torque signal corresponding to input torque to the automatic transmission; and
    an electronic control unit (ECU) which controls the automatic transmission with reference to a shift line of a throttle opening versus a vehicle speed, the ECU being programmed to:
    determine shift from the second speed to the first speed when the throttle opening crosses the shift line;
    carry out changeover control in accordance with the determined shift to achieve release of the second engaging element and engagement of the first engaging element;
    detect a magnitude of the torque signal before a predetermined time of the determined shift when the changeover control is carried out;
    compare the magnitude of the torque signal with a preprogrammed switch determination value;
    carry out a first control of the second engaging element when the magnitude of the torque signal is larger than the preprogrammed switch determination value;
    carry out a second control of the second engaging element when the magnitude of the torque signal is equal to or smaller than the preprogrammed switch determination value, the second control requiring shorter time than the first control; and
    control the release of the second engaging element in accordance with one of the first and second controls.

2. The system as claimed in claim 1, wherein the device comprises a throttle sensor for generating a signal indicative of the throttle opening, the throttle opening corresponding to the magnitude of the torque signal.

3. The system as claimed in claim 2, wherein the switch determination value has a characteristic in response to the vehicle speed and wherein the switch determination value is greater as the vehicle speed is higher.

4. The system as claimed in claim 1, wherein the first and second engaging elements are controlled hydraulically, wherein at the first and second controls, an engaging pressure of the second engaging element is reduced.

5. The system as claimed in claim 3, wherein the switch determination value is set at a value corresponding to a road load.

6. The system as claimed in claim 5, wherein the first control is carried out so that an engaging pressure of the first engaging element is reduced to a minimum value which allows transfer of the input torque.

7. The system as claimed in claim 5, wherein the second control is carried out so that an engaging pressure of the first engaging element is reduced to a value corresponding to a load of a return spring of the first engaging element.

8. A system, comprising:
    an automatic transmission which achieves a first speed by engagement of a first engaging element and a second speed by engagement of a second engaging element;
    means for generating a torque signal corresponding to input torque to the automatic transmission; and
    means for controlling the automatic transmission with reference to a shift line of a throttle opening versus a vehicle speed, the controlling means comprising:
    means for determining shift from the second speed to the first speed when the throttle opening crosses the shift line;
    means for carrying out changeover control in accordance with the determined shift to achieve release of the second engaging element and engagement of the first engaging element;
    means for detecting a magnitude of the torque signal before a predetermined time of the determined shift when the changeover control is carried out;
    means for comparing the magnitude of the torque signal with a preprogrammed switch determination value;
    means for carrying out a first control of the second engaging element when the magnitude of the torque signal is larger than the preprogrammed switch determination value;
    means for carrying out a second control of the second engaging element when the magnitude of the torque signal is equal to or smaller than the preprogrammed switch determination value, the second control requiring shorter time than the first control; and
    means for controlling the release of the second engaging element in accordance with one of the first and second controls.

9. A method of controlling an automatic transmission which achieves a first speed by engagement of a first engaging element and a second speed by engagement of a second engaging element, the automatic transmission being controlled with reference to a shift line of a throttle opening versus a vehicle speed, the method comprising:
    generating a torque signal corresponding to input torque to the automatic transmission;
    determining shift from the second speed to the first speed when the throttle opening crosses the shift line;
    carrying out changeover control in accordance with the determined shift to achieve release of the second engaging element and engagement of the first engaging element;
    detecting a magnitude of the torque signal before a predetermined time of the determined shift when the changeover control is carried out;
    comparing the magnitude of the torque signal with a preprogrammed switch determination value;
    carrying out a first control of the second engaging element when the magnitude of the torque signal is larger than the preprogrammed switch determination value;
    carrying out a second control of the second engaging element when the magnitude of the torque signal is equal to or smaller than the preprogrammed switch determination value, the second control requiring shorter time than the first control; and controlling the release of the second engaging element in accordance with one of the first and second controls.

10. The method as claimed in claim 9, wherein the torque signal generating step is carried out with a throttle sensor for generating a signal indicative of the throttle opening, the throttle opening corresponding to the magnitude of the torque signal.

11. The method as claimed in claim 10, wherein the switch determination value has a characteristic in response to the vehicle speed and wherein the switch determination value is greater as the vehicle speed is higher.

12. The method as claimed in claim 9, wherein the first and second engaging elements are controlled hydraulically, wherein at the first and second controls, an engaging pressure of the second engaging element is reduced.

13. The method as claimed in claim 11, wherein the switch determination value is set at a value corresponding to a road load.

14. The method as claimed in claim 13, wherein the first control is carried out so that an engaging pressure of the first engaging element is reduced to a minimum value which allows transfer of the input torque.

15. The method as claimed in claim 13, wherein the second control is carried out so that an engaging pressure of the first engaging element is reduced to a value corresponding to a load of a return spring of the first engaging element.

* * * * *